(12) United States Patent
Lee et al.

(10) Patent No.: US 9,530,043 B2
(45) Date of Patent: Dec. 27, 2016

(54) CELL ANALYSIS APPARATUS AND METHOD

(71) Applicants: SAMSUNG ELECTRO-MECHANICS CO., LTD., Suwon-Si (KR); SAMSUNG LIFE PUBLIC WELFARE FOUNDATION, Seoul (KR)

(72) Inventors: Dong Woo Lee, Suwon-Si (KR); Do Hyun Nam, Seoul (KR); Bo Sung Ku, Suwon-Si (KR); Yeon Sook Choi, Seongnam-si (KR)

(73) Assignees: Samsung Electro-Mechanics Co., Ltd., Suwon-si (KR); Samsung Life Public Welfare Foundation, Seoul (KR)

( * ) Notice: Subject to any disclaimer, the term of this patent is extended or adjusted under 35 U.S.C. 154(b) by 182 days.

(21) Appl. No.: 14/329,756

(22) Filed: Jul. 11, 2014

(65) Prior Publication Data

US 2015/0269411 A1    Sep. 24, 2015

(30) Foreign Application Priority Data

Mar. 18, 2014    (KR) .................... 10-2014-0031479

(51) Int. Cl.
*G06K 9/00*    (2006.01)
*G06T 7/60*    (2006.01)

(52) U.S. Cl.
CPC .......... *G06K 9/00127* (2013.01); *G06T 7/602* (2013.01); *G06T 7/604* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

2002/0168757 A1*   11/2002   Kirk .................. B01L 3/5025
                                                          435/288.5

FOREIGN PATENT DOCUMENTS

| JP | 2006-31593 A | 2/2006 | |
| KR | 10-2013-0052221 A | 5/2013 | |
| WO | WO 2012/041333 | * 4/2012 | ............... G06T 7/00 |

* cited by examiner

*Primary Examiner* — Atiba O Fitzpatrick
(74) *Attorney, Agent, or Firm* — NSIP Law (57) ABSTRACT

A cell analysis apparatus may include: an image processing unit imaging cultured cell colonies to convert the imaged cell colonies into digital signals; an outline extracting unit extracting outlines of the cell colonies from image data obtained from the image processing unit; a size calculating unit calculating sizes of the cell colonies from the extracted outlines; and a selecting unit comparing the sizes of the cell colonies with a preset value to select grown cell colonies.

7 Claims, 10 Drawing Sheets

| Patient-Derived cells | Micropillar/microwell Chip | | | 96-well Plate | | |
|---|---|---|---|---|---|---|
| | Control | SU11274 2µM | PHA665752 1µM | Control | SU11274 2µM | PHA665752 1µM |
| 448T | 22 | 209 | 106 | 18 | 107 | 96 |
| 464T | 17 | 43 | 32 | 12 | 600 | 334 |
| 775T | 76 | 2,163 | 4,407 | 21 | 2,272 | 21,470 |

CELL ANALYSIS APPARATUS AND METHOD

CROSS-REFERENCE TO RELATED APPLICATION

This application claims the benefit of Korean Patent Application No. 10-2014-0031479 filed on Mar. 18, 2014, with the Korean Intellectual Property Office, the disclosure of which is incorporated in entirety herein by reference.

BACKGROUND

The present disclosure relates to a cell analysis apparatus and a cell analysis method capable of determining whether or not a cell colony has formed.

The demand for biomedical apparatuses and biotechnology for rapidly diagnosing various human diseases has recently increased. Therefore, the development of experimental apparatuses and devices capable of providing diagnostic results for specific diseases within a relatively short period of time, diagnoses previously only able to be performed in a hospital or a research laboratory over a long period of time, has been actively conducted.

In order to develop new drugs and tests to determine the stability of such new drugs, it is essential to observe a reaction between the new drug (that is, a medicine) and cells. In general, a reaction experiment between a drug and cells is performed using a culture dish, or the like.

In general, whether or not cells respond to a drug is determined through changes in the sizes of cells. For example, cells actively responding to the drug form a single cell colony. In addition, a cell colony in which cells respond suitably to the drug has a significant size as compared to cells that do not respond to the drug or a cell colony in which cells do not respond suitably to the drug. Therefore, in the case of measuring a size of the cell or cell colony, efficacy of the corresponding drug for cells may be determined.

Meanwhile, cells may be freely positioned in a culture medium. For example, a proliferation space and a proliferation position of cells are not limited to a specific amount of space and a specific position in the culture medium. Therefore, in the case in which a plurality of cells proliferate in the culture medium, a plurality of cells may be overlapped with each other in a vertical or in a horizontal direction. In this case, since the plurality of cells may be misunderstood as being a single cell or a cell colony, reliability of results in analyzing drug efficacy may be deteriorated.

Particularly, in the case of performing three dimensional cell culturing in an extra-cellular matrix (ECM), drying the resultant cellular structure to form a two dimensional cell surface, and then analyzing the two dimensional cell surface, an overlapping phenomenon of the cell colony may be further increased, thereby significantly deteriorating reliability of the classification of cell colonies.

Therefore, a cell analysis apparatus and a cell analysis method capable of significantly decreasing a measurement error due to the overlapping phenomenon as described above should be developed.

SUMMARY

Some embodiments of the present disclosure may provide a cell analysis apparatus and a cell analysis method capable of efficiently analyzing whether or not a cell colony has formed.

According to some embodiments of the present disclosure, a cell analysis apparatus may include: an image processing unit imaging cultured cell colonies to convert the imaged cell colonies into digital signals; an outline extracting unit extracting outlines of the cell colonies from image data obtained from the image processing unit; a size calculating unit calculating sizes of the cell colonies from the extracted outlines; and a selecting unit comparing the sizes of the cell colonies with a preset value to select grown cell colonies.

The outline extracting unit may include a logic circuit extracting the outlines of the cell colonies using a difference in light and darkness of the image data.

The outline extracting unit may include a logic circuit extracting the outlines of the cell colonies using differences in brightness in the image data.

The size calculating unit may include a logic circuit configured so that an area of a random circle formed by the outline is recognized as the size of the cell colony.

The size calculating unit may include a selection circuit configured so that among random circles formed by the outline, an area of a largest circle is recognized as the size of the cell colony.

The size calculating unit may include a logic circuit configured so that a diameter of a random curve configuring the outline is recognized as the size of the cell colony.

The size calculating unit may include a selection circuit configured so that among diameters of random curves configuring the outline, the maximum diameter is recognized as the size of the cell colony.

The cell analysis apparatus may further include an overlapping determining unit determining whether or not the cell colonies are overlapped with each other.

The overlapping determining unit may include: a calculation circuit calculating a deviation between a long axis and a short axis of a figure formed by the outline; a comparison circuit comparing whether or not the calculated deviation is within a preset acceptable range; and a determination circuit determining whether or not the cell colony having the corresponding outline is overlapped with another cell colony based on the comparison circuit.

According to some embodiments of the present disclosure, a cell analysis method may include: recognizing shapes of cells or cell colonies; calculating a size of each of the cell colonies; determining whether or not the cell colonies are overlapped with each other; and sorting the cell colonies by size and calculating the number of cell colonies exceeding a preset size.

The size of the cell colony may be calculated as an area of a circle formed by an outline of the cell colony.

Among a plurality of circles formed by the outline of the cell colony, an area of a largest circle may be set as the size of the cell colony.

The size of the cell colony may be calculated as a radius of a curve configuring an outline of the cell colony.

Among radii of a plurality of curves forming the outline of the cell colony, the maximum radius may be set as the size of the cell colony.

Whether or not the cell colonies are overlapped with each other may be determined based on a degree of ellipticity of the shape of the cell colony.

When the degree of ellipticity of the shape of the cell colony is outside of an acceptable range, it may be determined that the corresponding cell colony is overlapped.

The cell analysis method may further include staining the cells with a fluorescent material.

The outline of the cell colony may be obtained by fluorescence-imaging of the cells stained with the fluorescent material.

BRIEF DESCRIPTION OF DRAWINGS

The above and other aspects, features and other advantages of the present disclosure will be more clearly understood from the following detailed description taken in conjunction with the accompanying drawings, in which:

FIGS. 4A through 5C are diagrams illustrating a method for determining a size of a cell colony;

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 1:
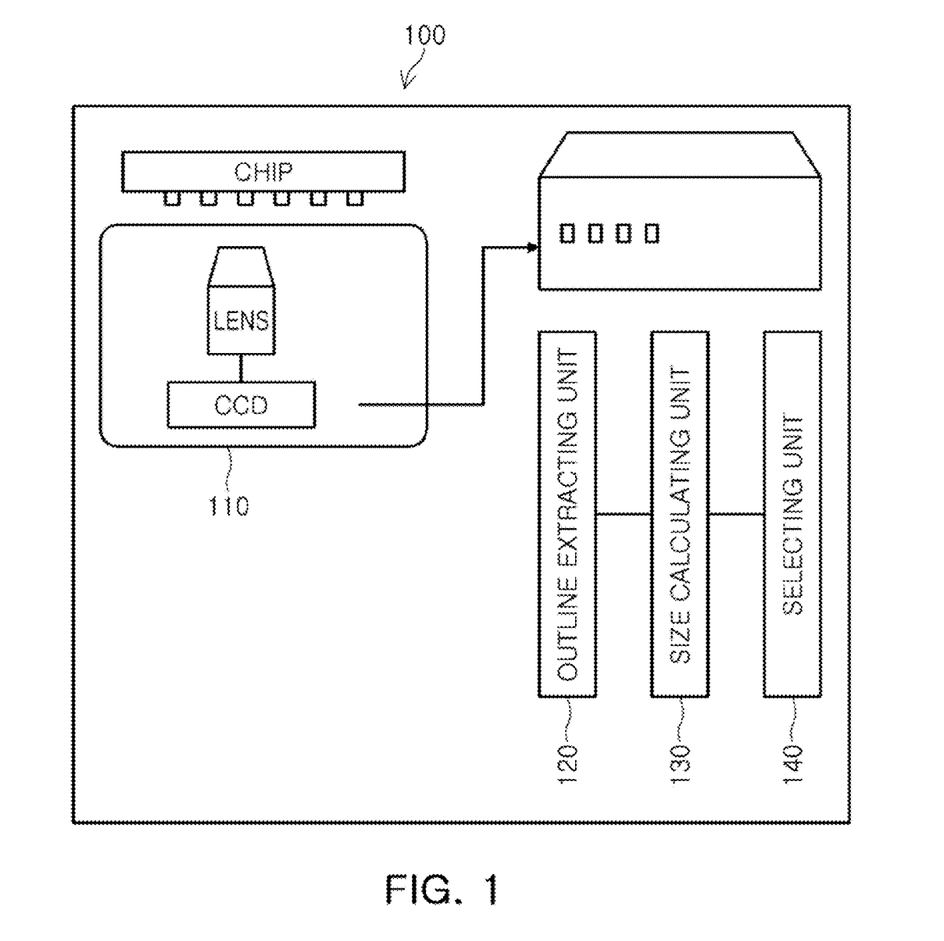
FIG. 1 is a configuration diagram of a cell analysis apparatus according to an exemplary embodiment of the present disclosure.
Figure 2:
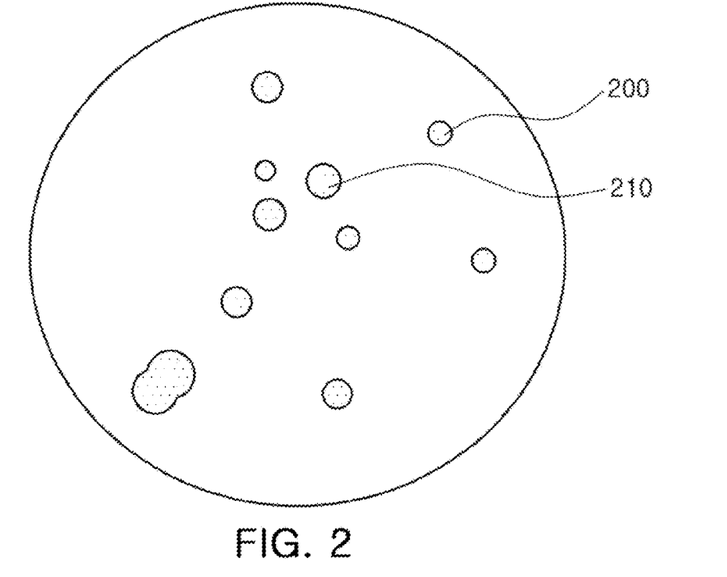
FIG. 2 is a diagram illustrating cell images before being converted into image data.
Figure 3:
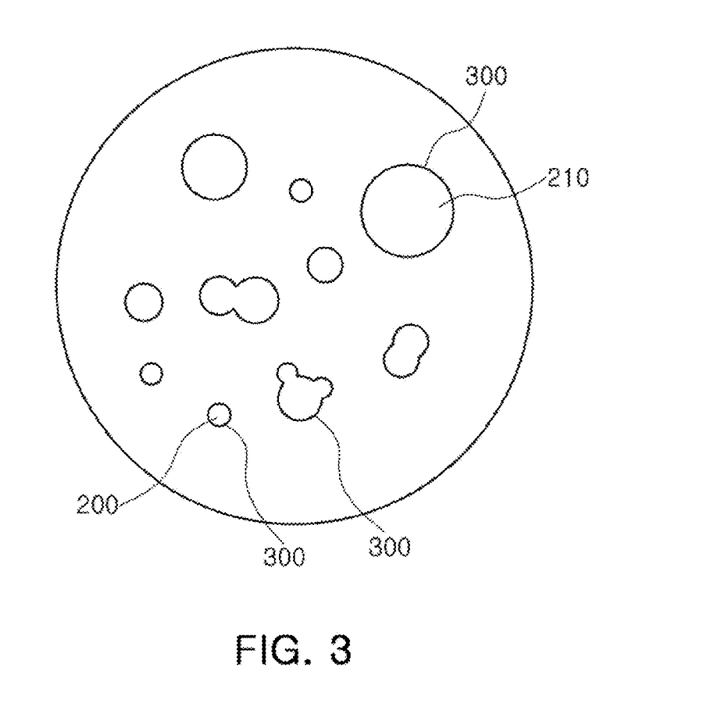
FIG. 3 is a diagram illustrating a state in which the cell images of FIG. 2 are converted into the image data.
Figure 5A:
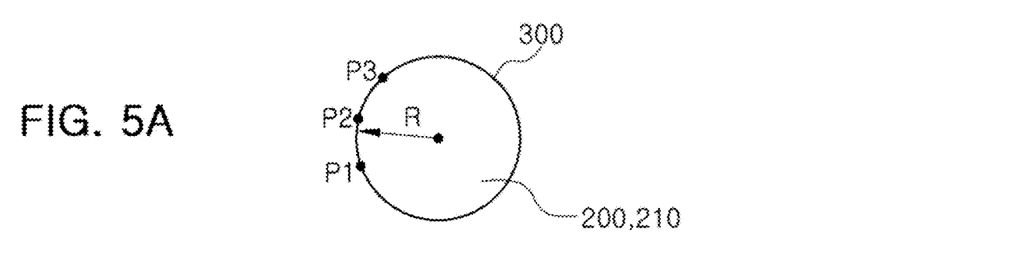
Figure 5B:
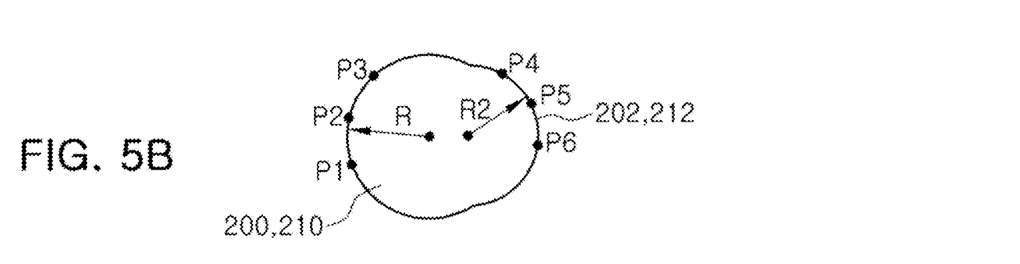
Figure 5C:
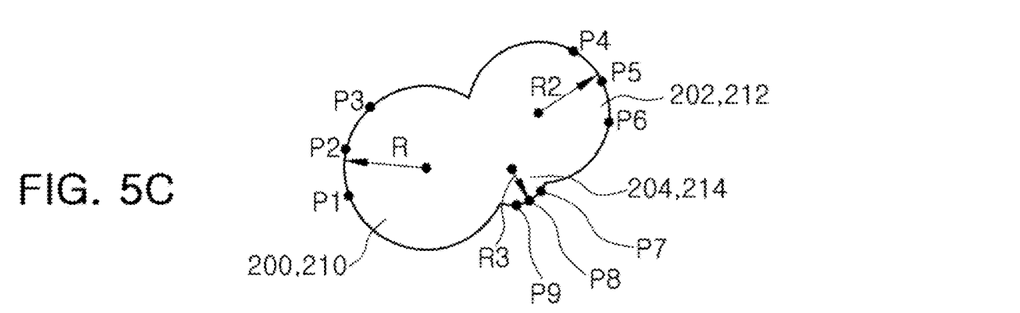
Figure 6:
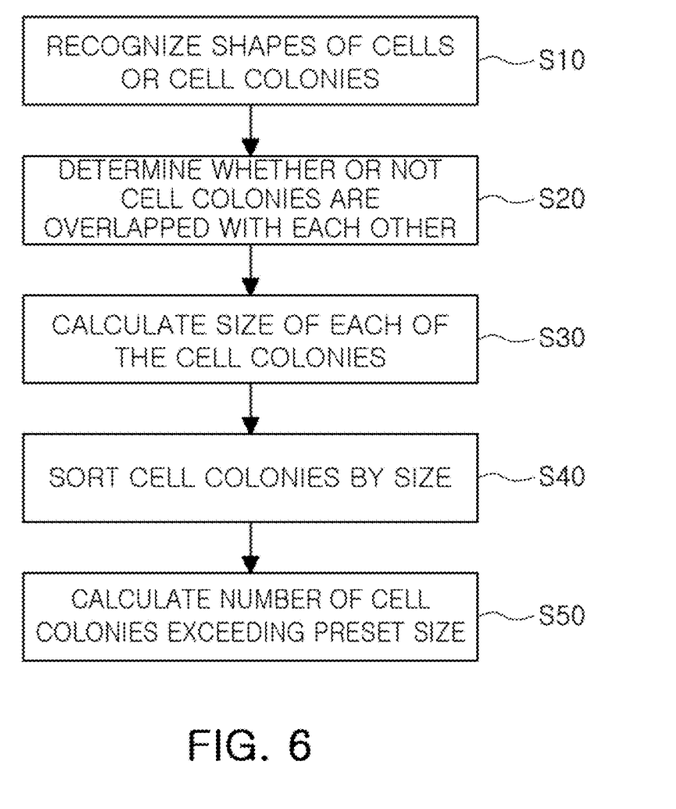
FIG. 6 is a flow chart illustrating a cell analysis method according to an exemplary embodiment of the present disclosure.
Figure 7A:
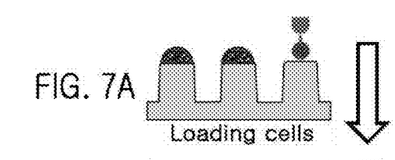
FIGS. 7A through 7E are diagrams illustrating a process of preparing cells for analysis.
Figure 7B:
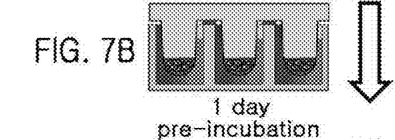
Figure 7C:
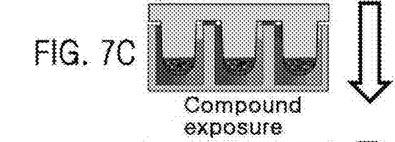
Figure 7D:
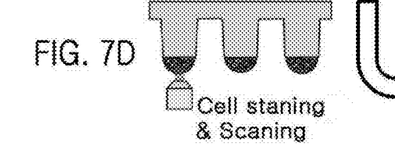
Figure 7E:
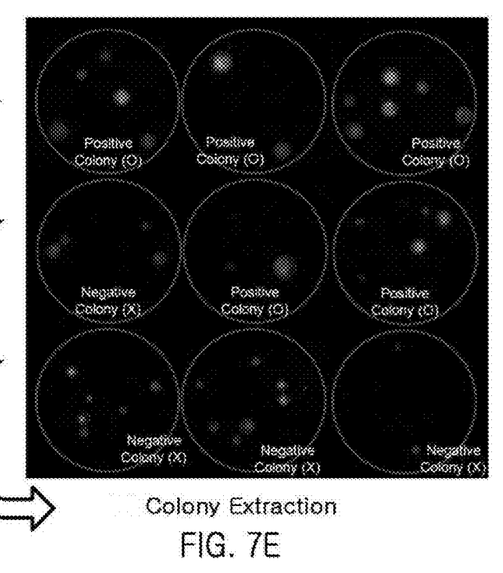
Figure 8A:
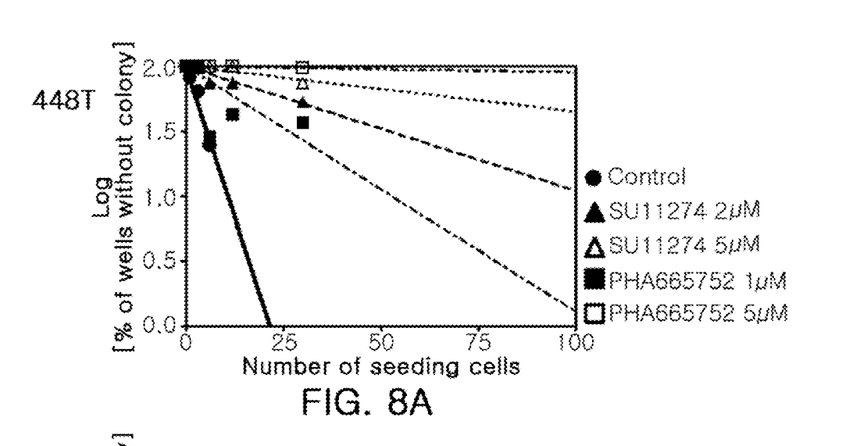
FIGS. 8A through 8C are graphs illustrating extraction results of cell colonies according to the cell analysis method.
Figure 8B:
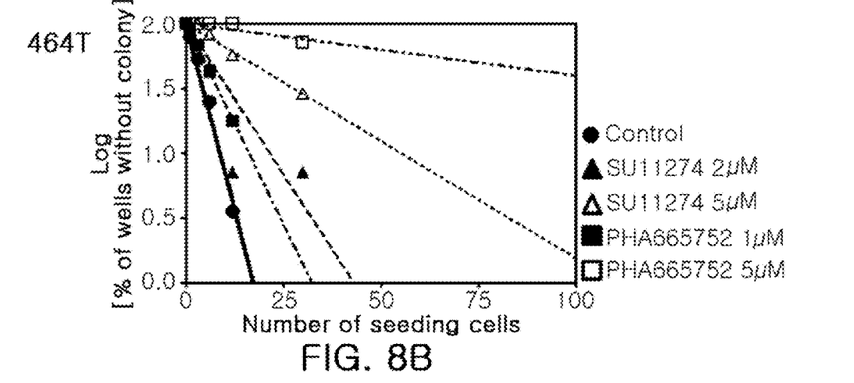
Figure 8C:
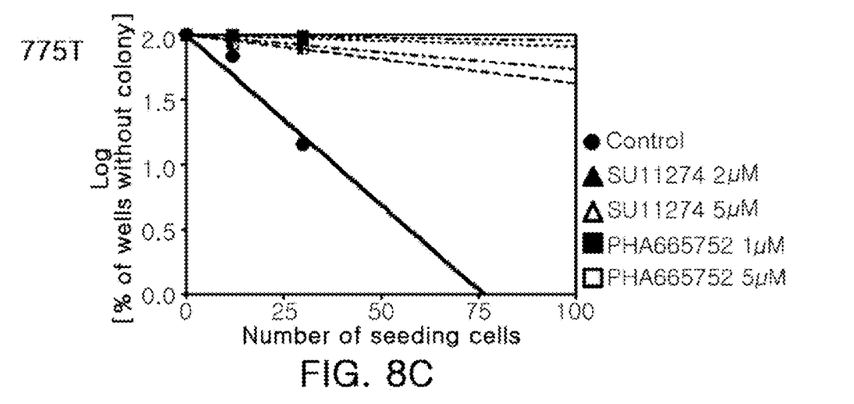
Figure 9A:
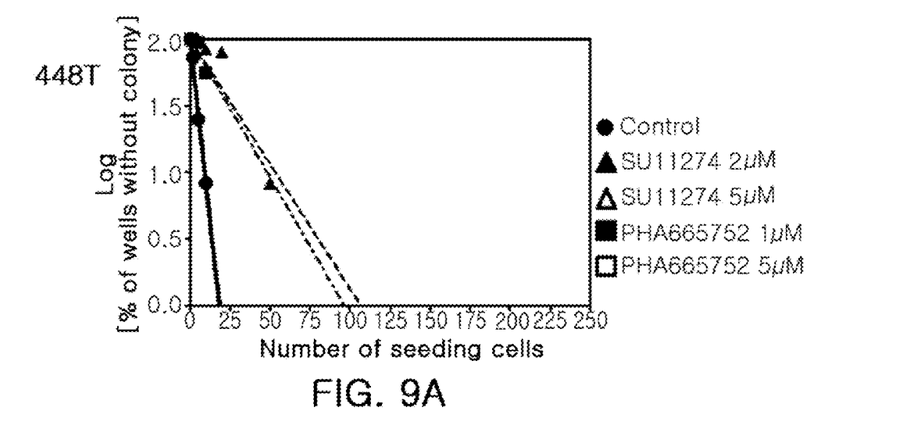
FIGS. 9A through 9C are graphs illustrating extraction results of cell colonies according to a cell analysis method according to the related art.
Figure 9B:
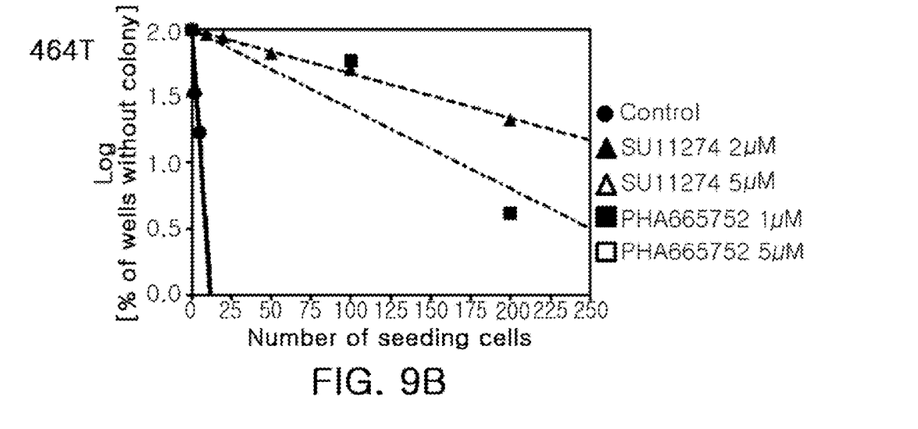
Figure 9C:
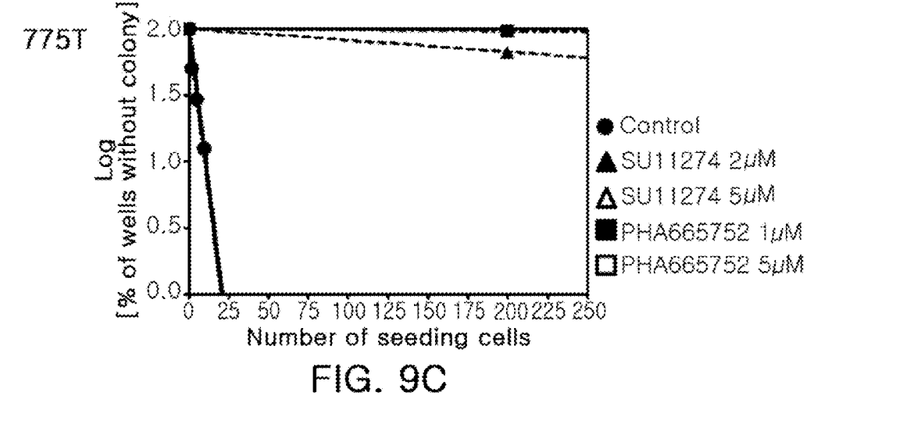
Figure 10:
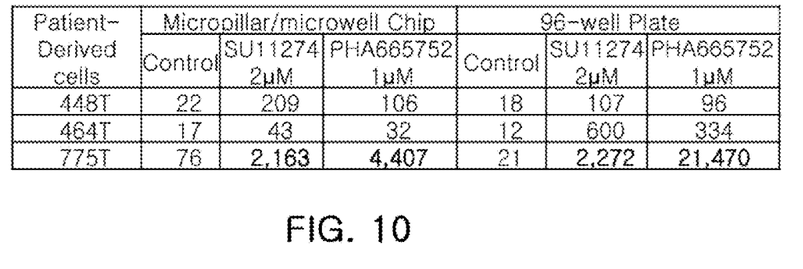
FIG. 10 is a table illustrating values according to the cell analysis method of FIG. 9.
Figure 11:
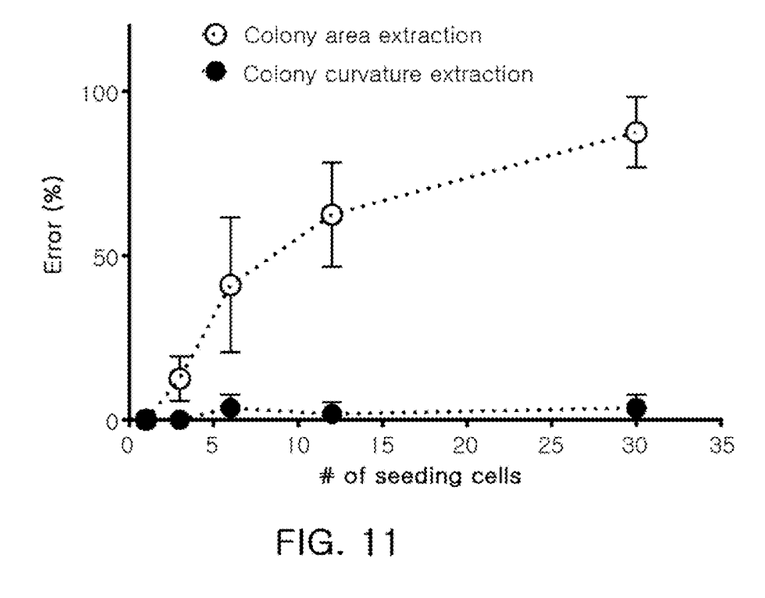
FIG. 11 is a graph illustrating an error rate according to a cell colony extracting method.
Figure 12A:
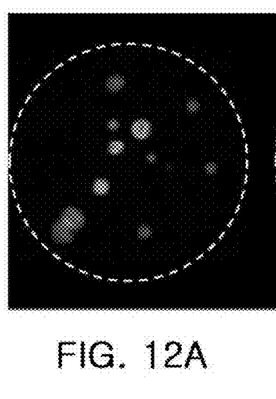
FIGS. 12A through 12C are images illustrating results according to the cell colony extracting method.
Figure 12B:
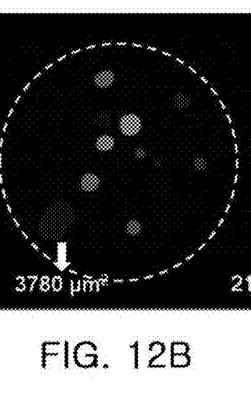
Figure 12C:
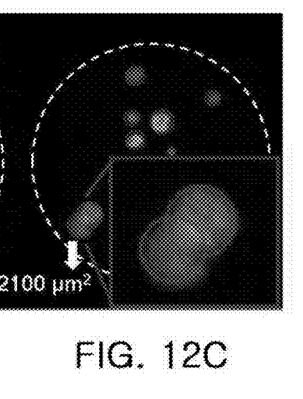

FIG. 1 is a configuration diagram of a cell analysis apparatus according to an exemplary embodiment of the present disclosure; FIG. 2 is a diagram illustrating cell images before being converted into image data; FIG. 3 is a diagram illustrating a state in which the cell images of FIG. 2 are converted into the image data; FIGS. 4A through 5C are diagrams illustrating a method for determining a size of a cell colony; FIG. 6 is a flow chart illustrating a cell analysis method according to an exemplary embodiment of the present disclosure; FIGS. 7A through 7E are diagrams illustrating a process of preparing cells for analysis; FIGS. 8A through 8C are graphs illustrating extraction results of cell colonies according to the cell analysis method; FIGS. 9A through 9C are graphs illustrating extraction results of cell colonies using a cell analysis method according to the related art; FIG. 10 is a table illustrating values according to the cell analysis method of FIG. 9; FIG. 11 is a graph illustrating an error rate according to a cell colony extracting method; and FIGS. 12A through 12C are images illustrating results according to the cell colony extracting method.

For reference, hereinafter, reference numeral 200 indicates a cell colony that does not respond to a drug or a cell colony having a size equal to or less than a standard size, and reference numeral 210 indicates a cell colony having a size equal to or greater than the standard size. In addition, cells that are not represented by separate reference numeral may be used as a comprehensive meaning including the above-mentioned cell colonies 200 and 210.

First, the process of preparing cells for analysis will be simply described with reference to FIGS. 7A through 7E.

The cells for analysis may be adhered to a cell chip. For example, the cells for analysis may be loaded on pillar surfaces of the cell chip (FIG. 7A). In addition, the cells for analysis may be immersed in a culture medium in a state in which the cells are adhered to the cell chip. For example, the cells for analysis may be cultured in a state in which the cells are immersed in the culture medium for one or two days or more (FIG. 7B). Further, the cells for analysis may be provided so as to react with an experimental drug or other drugs. For example, the cells for analysis may be immersed in a drug in a state in which the cells are adhered to the cell chip (FIG. 7C).

The cells for analysis prepared as described above may grow into a cell colony. In addition, the grown cell colony may be analyzed by the cell analysis apparatus (FIG. 7D). For example, the cell image analyzed by the cell analysis apparatus may be indicated as shown in FIG. 7E. In this case, the cell colony may be stained by a dye, and after being stained, the cell colony may be fixed in an operation of drying or injecting a fixation solution (or fixing material).

The cell analysis apparatus according to an exemplary embodiment of the present disclosure will be described with reference to FIG. 1.

The cell analysis apparatus 100 may include an image processing unit 110, an outline extracting unit 120, a size calculating unit 130, and a selecting unit 140. In addition, the cell analysis apparatus 100 may further include various additional units required to analyze cells. For example, the cell analysis apparatus 100 may further include a transfer unit transferring a cell chip or a member receiving cells. Further, the cell analysis apparatus 100 may further include a loading unit loading an analyzed cell chip in a single container. In addition, the cell analysis apparatus 100 may further include a drug injection unit injecting a drug or other solutions into the cell chip.

Hereinafter, main configurations of the cell analysis apparatus 100 will be described.

The image processing unit 110 may include all of the configurations converting a sample (for example, a cell colony) into digital signals. For example, the image processing unit 110 may be a digital camera device imaging the sample. Alternatively, the image processing unit may be a device such as a photo-sensor capable of recognizing a difference in light and darkness or brightness of the sample. In addition, the image processing unit 110 may be a device integrally including a device imaging the sample as analog signals and a device converting the analog signals into digital signals. However, the image processing unit 110 is not limited thereto. For example, the image processing unit 110 may include all of the devices recognizing cells contained in the sample to digitalize the recognized cells.

The image processing unit 110 may convert a state of the sample into digital signals or a digital file. For example, the image processing unit 110 may convert the captured image into a color image file. Alternatively, the image processing unit 110 may convert the captured image into a black-and-white image file. Alternatively, the image processing unit 110 may convert the captured image into a specific image file. For example, the image processing unit 110 may covert the captured image into a digital file so that a cell colony stained with a fluorescent material may be easily recognized.

The image processing unit 110 may transfer shape information of the sample converted into the digital signals to the outline extracting unit 120. Alternatively, the image processing unit 110 may share the shape information of the sample converted into the digital signals with the outline extracting unit 120. To this end, the image processing unit 110 may be electrically connected to the outline extracting unit 120.

The outline extracting unit 120 may include all of the configurations capable of graphically representing the digitalized image data. For example, the outline extracting unit 120 may include one or more circuits capable of recognizing a shape of the sample from the image data to graphically represent the shape of the sample based on the recognized shape. As an example, the outline extracting unit 120 may include one or more logic circuits capable of recognizing a color of the sample to graphically represent the shape of the sample based on the recognized color. As another example, the outline extracting unit 120 may include one or more logic circuits capable of recognizing the difference in light and darkness or brightness of the sample to graphically represent a specific portion (for example, a cell colony) of the sample based on the recognized difference. Here, shape information graphically represented by the outline extracting unit 120 may be converted into digital signals and then stored. To this end, the outline extracting unit 120 may further include a separate storage unit.

The outline extracting unit 120 may include a circuit forming a single closed curve corresponding to the sample (for example, a cell colony). For example, the outline extracting unit 120 may include a logic circuit forming a single closed curve along an outline of a cell colony. Therefore, the formed cell colony may generally have a circular shape. However, all of the cell colonies may not have a circular shape. For example, the cell colony may have an oval shape according to a type thereof. Meanwhile, as a logic method of extracting the shape of the cell colony, a Hough circle transform may be used.

The outline extracting unit 120 may be connected to the image processing unit 110. In addition, the outline extracting unit 120 may be a portion of the image processing unit 110. For example, the outline extracting unit may be a device performing a specific operation in various processes of digitalizing the captured image in the image processing unit 110. In addition, the outline extracting unit 120 may be connected to the size calculating unit 130.

The size calculating unit 130 may include all of the configurations capable of measuring a size of the sample (for example, the cell colony). For example, the size calculating unit 130 may include a configuration measuring the size of the cell colony through a figure formed by the outline. As an example, the size calculating unit 130 may include a circuit calculating or recognizing an area of a figure (for example, a circle) having a shape corresponding to the cell colony. As another example, the size calculating unit 130 may include a circuit calculating or recognizing a diameter of the figure having the shape corresponding to the cell colony.

The size calculating unit 130 may recognize the size of the sample (for example, the cell colony) as a unit of an area of the circle. For example, the size calculating unit 130 may recognize a basic shape of the figure indicated by the outline as a circle. If he corresponding figure does not have a circular shape but has another shape, the size calculating unit 130 may recognize the corresponding figure as two or more circles overlapped with each other, and divide an area of the corresponding figure to calculate the area.

In addition, the size calculating unit 130 may recognize the size of the cell colony as a unit of a radius or a diameter of a circle. For example, the size calculating unit 130 may extract a single average radius from a single outline to recognize the extracted average radius as the size of the cell colony. For reference, the average radius may be designated only in the case in which a deviation between the maximum radius and the minimum radius is not out of an error range. For example, when the deviation the maximum radius and the minimum radius is out of the error range, the size calculating unit 130 may recognize that the corresponding outline is formed by cell colonies overlapped with each other. In this case, the size calculating unit 130 may extract a plurality of radii from the corresponding outline and recognize the extracted radii as cell colonies that are different from each other.

The selecting unit 140 may include all of the configurations sorting cell colonies by size. For example, the selecting unit 140 may include a circuit sorting areas of figures (circles) or radii of circles in a sequence of sizes thereof. In addition, the selecting unit 140 may include all of the configurations selecting a random cell colony from the cell colonies sorted by size. For example, the selecting unit 140 may include a circuit sorting a cell colony having an area or a radius satisfying a preset condition. In addition, the selecting unit 140 may include all of the configurations calculating the number of sorted cell colonies.

The selecting unit 140 may include a logic circuit recognizing a single outline as a single cell colony. For example, in the case in which a plurality of circles are extracted from a single outline (that is, a single closed curve), the selecting unit 140 may recognize an area of a largest circle among the extracted circles as a size of a cell colony representing the corresponding outline. As another example, in the case in which a plurality of radii are extracted from a single outline, the selecting unit 140 may recognize the maximum radius among the extracted radii as the size of the cell colony representing the corresponding outline.

The cell analysis apparatus 100 configured as described above may easily determine a cell colony satisfying a set condition. In addition, the cell analysis apparatus 100 may accurately calculate the number of cell colony satisfying the set condition.

Hereinafter, the image data obtained by the cell analysis apparatus will be described with reference to FIGS. 2 and 3.

A sample including a plurality of cell colonies may have a shape as shown in FIG. 2. For example, the cell colony may be represented by a bright circle, and a culture medium supplying nutrients to the cell colony may be represented by a dark color. In addition, since a cell colony well responding to a drug continuously grows, this cell colony may be shown as a cell colony 210 having a relatively large area. Unlike this, since a cell colony that does not respond to the drug does not grow, this cell colony may be maintained in a cell colony 200 having a size equal or similar to size of the cell colony in an initial culture.

The samples including various cell colonies as described above may be represented in a shape shown in FIG. 3 through the cell analysis apparatus 100. That is, the cell analysis apparatus 100 may digitalize the plurality of cell colonies into figures having a single outline 300.

Here, most of the cell colonies may be represented by a single circle. However, some of the cell colonies may be overlapped with other cell colonies to thereby be represented by another shape rather than a circular shape as shown in FIG. 3. Since this cell colony has an area larger than those of other cell colonies when viewed by the naked eye, this cell colony may be misunderstood as a cell colony growing due to response to the drug. In addition, this cell colony may deteriorate reliability for a drug response experiment.

However, the cell analysis apparatus 100 may easily solve the above-mentioned problems through the size calculating unit 130 and the selecting unit 140.

Hereinafter, a method for determining a size of a cell colony will be described with reference to FIGS. 4A through 5C.

The cell analysis apparatus 100 may measure an area of a figure formed by an outline to determine a size of a cell colony.

Figure 4A:
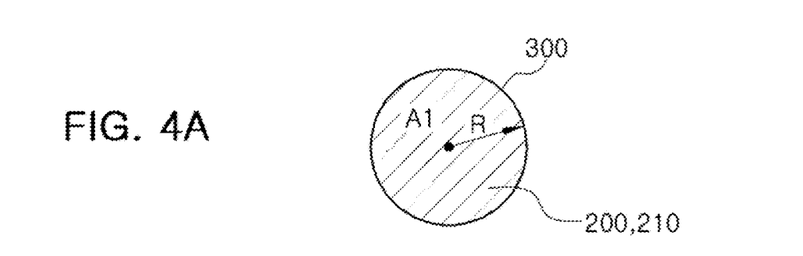
Figure 4B:
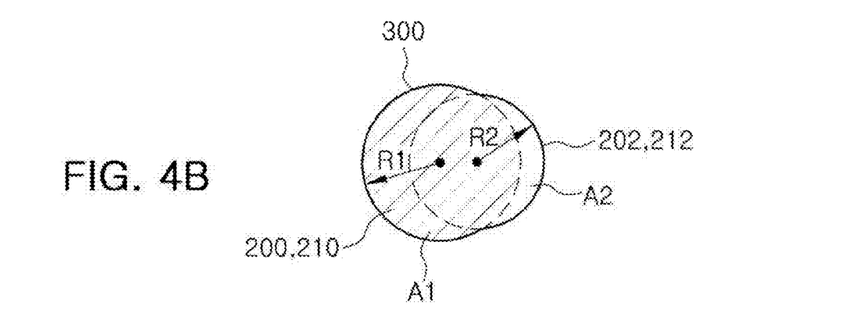
Figure 4C:
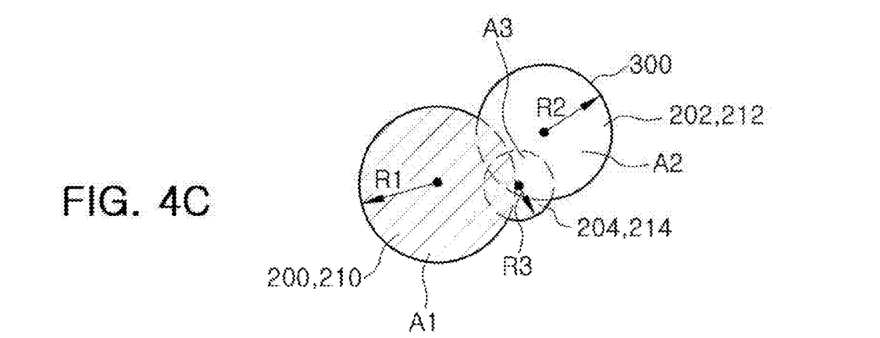

For example, the cell analysis apparatus 100 may measure an area of a figure formed by an outline 300 to determine a size of a cell colony as shown in FIG. 4. As an example, in the case in which a single circle is extracted by a single outline, a size of a cell colony 200 or 210 may be determined by measuring an area A of the corresponding circle (see FIG. 4A).

As another example, in the case in which two or more circles are extracted by a single outline 300, all of the circles capable of being extracted by the outline 300 may be recognized. Then, the recognized circles are considered as each of the cells 200, 202, and 204 or each of the cell colonies 210, 212, and 214, and all of the areas A1, A2, and A3 of respective circles may be calculated. In addition, among the calculated areas of the circles, the largest area may be recognized as a size of a cell or cell colony representing the corresponding outline 300 (see FIGS. 4B and 4C).

The cell analysis apparatus 100 may measure a radius of an outline to determine a size of a cell colony. For example, the cell analysis apparatus 100 may measure a radius or a diameter of an outline 300 to determine a size of a cell colony as shown in FIG. 5. Here, the radius or diameter of the outline 300 may be determined by randomly extracting continuous three points P1, P2, and P3.

Meanwhile, the single outline 300 may have one or more radii. Therefore, each of the outlines 300 may have sizes of cell colonies that are different from each other. As an example, in the case in which all of the points P1, P2, and P3 of the outline 300 have a single radius R generally within an error range, the corresponding radius R may be determined as a size of a cell colony 200 or 210 (see FIG. 5A).

As another example, in the case in which points P1 to P3, P4 to P5, and P7 to P9 of the outline 300 have different radii R1, R2, and R3, each of the radii R1, R2, and R3 may be determined as the sizes of the cell colonies 200 and 210 that are different from each other (see FIGS. 5B and 5C). In addition, if necessary, among the plurality of determined radii, the maximum radius may be considered as a size of a cell colony representing the corresponding outline 300.

In the processing structure as described above, since cell colonies overlapped with each other are not recognized as a single cell colony but may be recognized as separate cell colonies, an analysis error due to the cell colonies overlapped with each other may be solved.

Hereinafter, a cell analysis method according to an exemplary embodiment of the present disclosure will be described with reference to FIG. 6.

The cell analysis method according to the present exemplary embodiment may include an operation of recognizing shapes of cell colonies; an operation of determining whether or not the cell colonies are overlapped with each other, an operation of calculating sizes of the cell colonies; sorting the cell colonies. In addition, the cell analysis method may further include an operation of calculating the number of cell colonies.

1) Operation of Recognizing Shape of Cell Colonies

This operation may include all of the operations of recognizing the shapes of the cell colonies. For example, this operation may include an operation of imaging a sample including cell colonies. In addition, this operation may include an operation of digitalizing the captured image. Further, this operation may include an operation of graphically representing the shapes of the cell colonies from the digitalized image. For example, this operation may include an operation of forming outlines along the shapes of the cell colonies.

2) Operation of Determining Whether or Not Cell Colonies are Overlapped with Each Other This operation may include all of the operations of determining whether or not the cell colonies are overlapped with each other. For example, in this operation, when a plurality of circles or radii are extracted from a single outline, it may be recognized that the corresponding outline is formed by cell colonies overlapped with each other.

In addition, this operation may include an operation of setting sizes of the cell colonies overlapped with each other. For example, in this operation, among the plurality of circles or radii extracted from the single outline, the maximum size may be set as a size of the corresponding outline.

In addition, this operation may include an operation of separating the cell colonies overlapped with each other. For example, in this operation, the plurality of circles or radii extracted from the single outline may be recognized as circles or radii extracted from outlines separated from each other, and sizes thereof may be set as sizes of outlines separated from each other.

3) Operation of Calculating Sizes of Cell Colonies

This operation may include all of the operations of calculating sizes of the cell colonies. For example, this operation may include an operation of extracting areas of figures represented by outlines or radii of the outlines. In addition, this operation may include an operation of recognizing the extracted areas of the figures or radii of the outlines as the sizes of the cell colonies.

4) Operation of Sorting Cell Colonies

This operation may include all of the operations of sorting the cell colonies by size. For example, in this operation, the areas of the figures or the radii of the outlines may be sorted by size.

In addition, this operation may include an operation of re-sorting the cell colonies sorted by size based on a preset condition. For example, in this operation, cell colonies satisfying the preset condition is sorted into a drug response group, and a cell colonies that do not satisfy the preset condition may be sorted into a drug non-response group.

5) Operation of Calculating Number of Cell Colonies

This operation may include all of the operations of calculating the number of cell colonies. In addition, this operation may include an operation of calculating the number of drug response groups to the total number of cell colonies.

Since the cell analysis method configured as described above includes the operation of determining whether or not the cell colonies are overlapped with each other, the method may be advantageous for accurately calculating the number of drug response groups.

Hereinafter, the cell analysis apparatus and the cell analysis method according to the present disclosure will be compared with those according to the related art with reference to FIGS. 8A through 11.

FIGS. 8A through 9C show results of analyzing the number of cell colonies for the same samples as each other. For reference, in FIGS. 8A through 9C, a solid line indicates results of analyzing the number of cell colonies according to the present disclosure, and other lines indicates results of analyzing the number of cell colonies according to the related art.

FIGS. 8A through 8C show results of limited dilution assay depending on a significantly small number of cells using a cell colony analysis technology according to the present disclosure. An X-axis indicates the number of seeding cells, and a Y-axis indicates a ratio of cells that did not form a cell colony, the ratio being expressed as a log value. The ratio of cells that did not form a colony was obtained through a total of 14 same experiments. The case in which a Y axis value is 2 means that in all of the experiments, the cell colony was not formed, and the case in which the Y axis value is 1.7 means that a ratio of the experiments in which the cell colony was not formed was about 50%. That is, in 7 experiments among 14 experiments using the same number of seeding cells, cells did not form a cell colony. In the experiments as described above, which correspond to Inventive Examples, the ratio of cells forming the cell colony was derived using an automatic cell analysis apparatus according to the present disclosure, and the results are shown in FIGS. 8A through 8C.

FIGS. 9A through 9C illustrate results obtained by performing 3-dimensional culture of cells in a 96 well plate according to the related art and analyzing a significantly small number of cells using limited dilution assay under conditions similar to those in FIGS. 8A through 8C. For reference, extraction of the cell colony was performed using the naked eye.

FIG. 10 illustrates x-intercepts of response straight lines at each of the drug concentration conditions in graphs of FIGS. 8A through 9C. For reference, the larger the number in FIG. 10, the higher drug response, such that the drug may effectively kill cells. As shown in FIG. 10, an experimental result of the existing 96-well plate in which the cell colony was extracted using the naked eye and an experimental result of a micropillar/microwell chip in which the cell colony was automatically extracted using the present disclosure were similar to each other. That is, in both of the two experimental results, strong drug response was shown in 775T cells.

FIG. 11 illustrates an experimental result capable of confirming accuracy of the automatic cell analysis apparatus according to the present disclosure. (For reference, in FIG. 11, ● indicates an error rate of the cell analysis apparatus according to the present disclosure, and ○ indicates an error rate of a cell analysis apparatus according to the related art in which at the time of extracting a cell colony, only an area is recognized.) For example, in the cell analysis apparatus and the cell analysis method according to the present disclosure, the error rate was generally constant regardless of the numbers of countered cell colonies. Unlike this, in the cell analysis apparatus and the cell analysis method according to the related art, as the number of counted cell colonies is increased, the error rate is also significantly increased due to images of the cell colonies overlapped with each other, or the like. As an example, at the condition at which the number of initial seeding cells was 30, in the cell analysis apparatus according to the present disclosure, the error rate was 5% or less, but in the cell analysis apparatus according to the related art, the error rate was increased up to 90%. This result proves that in the related art, as cell colonies overlapped with each other were recognized, the number of cell colonies was abnormally largely calculated, but in the present disclosure, as the cell colonies overlapped with each other were positively excluded, a substantially grown cell colonies were determined.

FIGS. 12A through 12C illustrate Comparative Examples according to a cell colony extracting method. FIG. 12A is an original image before extracting cell colonies, FIG. 12B is an image according to the related art in which at the time of extracting a cell colony, only an area size is recognized, and FIG. 12C is an image according to the present disclosure in which the cell colony is recognized as a circle and then extracted.

As shown in FIGS. 12A through 12C, since in the related art, the cell colony is extracted using only the area size, two cell colonies may be recognized as a single cell colony. Unlike this, according to the present disclosure, since the cell colony is recognized as the circle, cell colonies overlapped with each other may be recognized as separate cell colonies. Therefore, according to the present disclosure, extraction accuracy and reliability of the cell colony may be improved.

As set forth above, according to exemplary embodiments of the present disclosure, whether or not the cells respond to the drug may be accurately determined.

While exemplary embodiments have been shown and described above, it will be apparent to those skilled in the art that modifications and variations could be made without departing from the spirit and scope of the present disclosure as defined by the appended claims.

What is claimed is:

1. A cell analysis method comprising:
recognizing shapes of cells or cell colonies;
calculating a size of each of the cell colonies;
determining whether or not the cell colonies are overlapped with each other;
dividing a recognized cell colony image region in recognition of overlapping thereby allowing for accurate colony size determination; and
sorting the cell colonies by size and calculating the number of cell colonies exceeding a preset size,
wherein the size of the cell colony is calculated as an area of a circle formed by an outline of the cell colony, and among a plurality of circles formed by the outlined of the cell colony, an area of a largest circle is set as the size of the cell colony.

2. The cell analysis method of claim 1, wherein the size of the cell colony is calculated as a radius of a curve configuring an outline of the cell colony.

3. The cell analysis method of claim 2, wherein among radii of a plurality of curves forming the outline of the cell colony, the maximum radius is set as the size of the cell colony.

4. The cell analysis method of claim 1, wherein whether or not the cell colonies are overlapped with each other is determined based on a degree of ellipticity of the shape of the cell colony.

5. The cell analysis method of claim 4, wherein when the degree of ellipticity of the shape of the cell colony is outside of an acceptable range, it is determined that the corresponding cell colony is overlapped.

6. The cell analysis method of claim 1, further comprising staining the cells with a fluorescent material.

7. The cell analysis method of claim 6, wherein the outline of the cell colony is obtained by fluorescence-photography of the cells stained with the fluorescent material.

* * * * *